(12) United States Patent
Horgan et al.

(10) Patent No.: US 12,055,242 B2
(45) Date of Patent: Aug. 6, 2024

(54) SYSTEMS AND METHODS OF QUICK INSTALL GASKET

(71) Applicant: Tyco Fire Products LP, Lansdale, PA (US)

(72) Inventors: Michael Horgan, East Greenwich, RI (US); Gary Luiz, Warwick, RI (US)

(73) Assignee: Tyco Fire Products LP, Cranston, RI (US)

( * ) Notice: Subject to any disclaimer, the term of this patent is extended or adjusted under 35 U.S.C. 154(b) by 330 days.

(21) Appl. No.: 17/294,282

(22) PCT Filed: Nov. 13, 2019

(86) PCT No.: PCT/IB2019/059768
§ 371 (c)(1),
(2) Date: May 14, 2021

(87) PCT Pub. No.: WO2020/100074
PCT Pub. Date: May 22, 2020

(65) Prior Publication Data
US 2022/0010896 A1 Jan. 13, 2022

Related U.S. Application Data

(60) Provisional application No. 62/768,236, filed on Nov. 16, 2018.

(51) Int. Cl.
*F16L 17/035* (2006.01)
*F16J 15/48* (2006.01)

(52) U.S. Cl.
CPC ............ *F16L 17/035* (2013.01); *F16J 15/48* (2013.01)

(58) Field of Classification Search
CPC .. F16J 15/00; F16J 15/02; F16J 15/021; F16J 15/10; F16J 15/025; F16L 17/04;
(Continued)

(56) References Cited

U.S. PATENT DOCUMENTS 4,311,248 A * 1/1982 Westerlund ............. F16L 23/06
285/365
4,350,350 A 9/1982 Blakeley
(Continued)

FOREIGN PATENT DOCUMENTS

CA 2732427 A 1/2010
CA 2732427 C 1/2010
(Continued)

OTHER PUBLICATIONS

International Search Report and Written Opinion on International Application No. PCT/IB2019/059768, dated Feb. 12, 2020, 12 pages.

*Primary Examiner* — Aaron M Dunwoody
(74) *Attorney, Agent, or Firm* — Foley & Lardner LLP (57) ABSTRACT

A gasket has an annular gasket base extending circumferentially about a gasket axis. A central flange extends inwardly away from the gasket base toward the gasket axis. The central flange has an apex positioned at a first distance from the gasket axis. A first arm is spaced apart from the central flange and extends radially and inwardly away from the gasket base toward the gasket axis. The first arm includes a first sealing portion. The first sealing portion defines a first sealing surface spaced apart from the gasket axis by a second distance which is greater than the first distance. A second arm is spaced apart from the central flange and extends radially and inwardly away from the gasket base toward the gasket axis. The second arm includes a second sealing portion defining a second sealing surface.

16 Claims, 4 Drawing Sheets

(58) Field of Classification Search
CPC ......... F16L 17/035; F16L 17/03; F16L 23/04;
F16L 23/08; F16L 21/005; F16L 21/06;
F16L 21/065
See application file for complete search history.

(56) References Cited

U.S. PATENT DOCUMENTS

| | | | |
|---|---|---|---|
| 8,282,136 B2 | 10/2012 | Vandal et al. | |
| 8,550,502 B2 | 10/2013 | Vandal et al. | |
| 8,615,865 B2 | 12/2013 | Vandal et al. | |
| 9,239,123 B2 | 1/2016 | Vandal et al. | |
| 9,297,482 B2 | 3/2016 | Vandal et al. | |
| 9,404,608 B2 | 8/2016 | Lippka | |
| 10,036,493 B2 | 7/2018 | Vandal et al. | |
| 10,047,885 B2 | 8/2018 | Vandal | |
| 10,190,707 B2 | 1/2019 | Brandt et al. | |
| 2008/0284159 A1 | 11/2008 | Krehl | |
| 2010/0001521 A1 | 1/2010 | Vandal et al. | |
| 2011/0037250 A1* | 2/2011 | Bowman | F16L 17/04 277/625 |
| 2012/0124804 A1 | 5/2012 | Vandal et al. | |
| 2012/0280494 A1 | 11/2012 | Vandal et al. | |
| 2014/0001753 A1 | 1/2014 | Vandal et al. | |
| 2014/0076413 A1 | 3/2014 | Vandal et al. | |
| 2015/0209919 A1 | 7/2015 | Vandal et al. | |
| 2015/0211664 A1 | 7/2015 | Vandal et al. | |
| 2015/0369405 A1 | 12/2015 | Vandal et al. | |
| 2018/0200550 A1* | 7/2018 | Bancroft | B05B 15/65 |
| 2018/0347730 A1 | 12/2018 | Bancroft | |

FOREIGN PATENT DOCUMENTS

| | | | |
|---|---|---|---|
| WO | WO-2010/002695 A2 | 1/2010 | |
| WO | WO-2010/002695 A3 | 1/2010 | |

* cited by examiner

SYSTEMS AND METHODS OF QUICK INSTALL GASKET

CROSS-REFERENCE TO RELATED APPLICATIONS

The present disclosure claims the benefit of priority to U.S. Provisional Application No. 62/768,236, titled "SYSTEMS AND METHODS OF QUICK INSTALL GASKET," filed Nov. 16, 2018, the disclosure of which is incorporated herein by reference in its entirety.

BACKGROUND

Gaskets can be used in pipe installations to seal two separate pipe ends that connect in a pipe fitting. Gaskets can be stretched over the end of the pipe during installation, which can be difficult and time consuming. The gaskets can be difficult to use when aligning each pipe end and fitting the gasket over the pipe end.

SUMMARY

One implementation of the present disclosure is a gasket. The gasket has an annular gasket base extending circumferentially about a gasket axis. A central flange extends radially and inwardly away from the gasket base toward the gasket axis. The central flange has an apex positioned at a first distance from the gasket axis. A first arm is spaced apart from the central flange and extends radially and inwardly away from the gasket base toward the gasket axis. The first arm includes a first sealing portion. The first sealing portion defines a first sealing surface spaced apart from the gasket axis by a second distance which is greater than the first distance. The first sealing surface extends toward the central flange, parallel to the gasket axis, in a first direction. A second arm is spaced apart from the central flange and extends radially and inwardly away from the gasket base toward the gasket axis. The second arm includes a second sealing portion defining a second sealing surface. The second sealing surface is spaced apart from the gasket axis by the second distance and extends toward the central flange, parallel to the gasket axis, in a second direction opposite the first direction.

Another implementation of the present disclosure is a pipe coupling. The pipe coupling includes a housing defining a channel and a gasket received within the channel. The gasket includes an annular gasket base extending circumferentially about a gasket axis. The gasket includes a central flange extending radially and inwardly away from the gasket base toward the gasket axis, the central flange having an apex positioned at a first distance from the gasket axis. The gasket includes a first arm spaced apart from the central flange and extending radially and inwardly away from the gasket base toward the gasket axis, the first arm including a first sealing portion defining a first sealing surface spaced apart from the gasket axis by a second distance greater than the first distance and extending toward the central flange, parallel to the gasket axis, in a first direction. The gasket includes a second arm spaced apart from the central flange and extending radially and inwardly away from the gasket base toward the gasket axis, the second arm including a second sealing portion defining a second sealing surface spaced apart from the gasket axis by the second distance and extending toward the central flange, parallel to the gasket axis, in a second direction opposite the first direction.

BRIEF DESCRIPTION OF THE DRAWINGS

The accompanying drawings, which are incorporated herein and constitute part of this specification, illustrate exemplary embodiments of the present disclosure, and together, with the general description given above and the detailed description given below, serve to explain the features of the present disclosure.

DETAILED DESCRIPTION

The present disclosure relates generally to the field of pipe fittings. More particularly, the present disclosure relates to systems and methods of a quick install gasket. In some embodiments, a gasket is provided. The gasket has an annular gasket base extending circumferentially about a gasket axis. A central flange extends radially and inwardly away from the gasket base toward the gasket axis. The central flange has an apex positioned at a first distance from the gasket axis. A first arm is spaced apart from the central flange and extends radially and inwardly away from the gasket base toward the gasket axis. The first arm includes a first sealing portion. The first sealing portion defines a first sealing surface spaced apart from the gasket axis by a second distance which is greater than the first distance. The first sealing surface extends toward the central flange, parallel to the gasket axis, in a first direction. A second arm is spaced apart from the central flange and extends radially and inwardly away from the gasket base toward the gasket axis. The second arm includes a second sealing portion defining a second sealing surface. The second sealing surface is spaced apart from the gasket axis by the second distance and extends toward the central flange, parallel to the gasket axis, in a second direction opposite the first direction.

In existing systems, gasket installation can rely on the gasket being stretched over the end of a pipe. The stretching action can be difficult to perform, and can increase installation times. The present solution enables a gasket that can be pushed onto a pipe end without stretching the gasket on a nominal diameter pipe. In some embodiments, the gasket includes a radius on a corner of the gasket to enable the gasket to slide over a maximum flared pipe. In some embodiments, the gasket includes a radius on an inside of a sealing surface of the gasket, which can enable the pipe to be slid over an edge of a groove of the pipe end, allowing an installer to easily position the gasket in a proper position. In some embodiments, the gasket includes two protrusions on an outside of the gasket, which may be positioned tangent to the radius on the inside of the gasket, and which can increase a sealing force between the gasket and the groove of the pipe.

Figure 1:
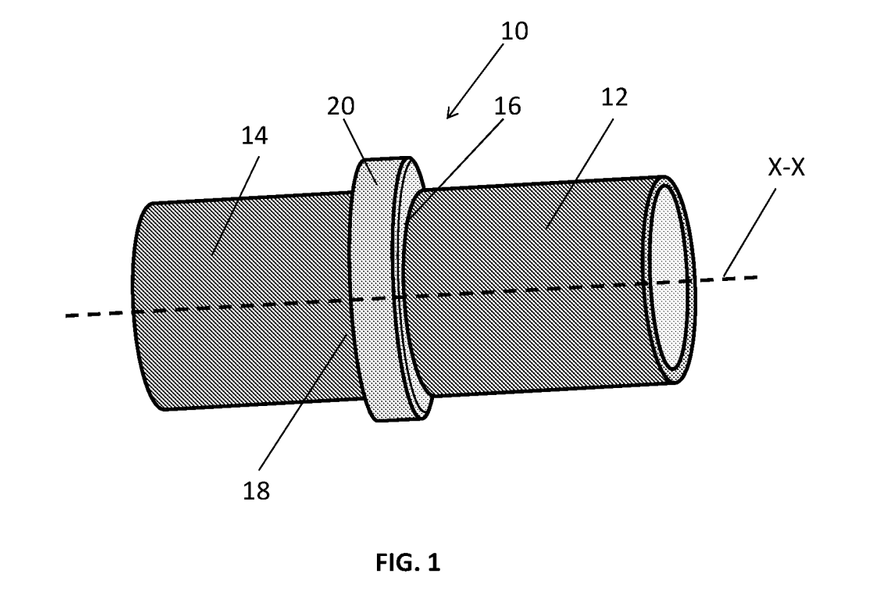
FIG. 1 is a perspective view of a pipe coupling formed with a housing and a gasket.

Referring now to FIG. 1, a pipe coupling 10 is shown forming a fluidic seal between two adjacent pipes 12, 14.

The pipe coupling 10 can join two pipe ends 16, 18 in an axial alignment about a gasket axis X-X, for example. The pipe ends 16, 18 can be of any fluid carrying structure, such as for example, the end of a pipe 12, 14, a pipe fitting (not shown), valve (not shown), or a fire protection sprinkler (not shown).

Figures 2A, 2B:
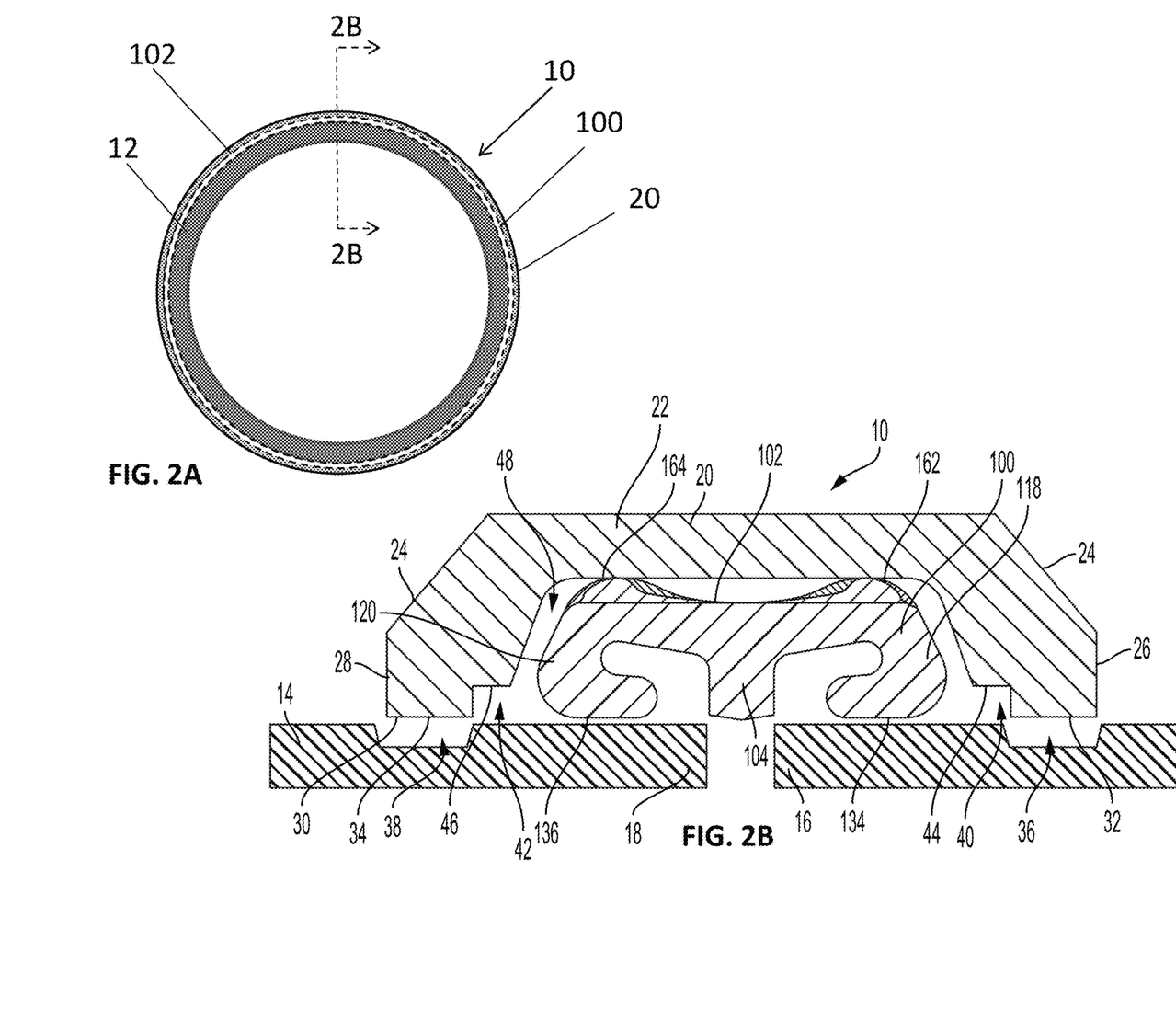
FIG. 2A is a front view of the pipe coupling of FIG. 1, displaying the internal components of the pipe coupling prior to being tightened around two pipes.
FIG. 2B is a partial cross-sectional view of the pipe coupling of FIG. 1, taken along lines 2B-2B in FIG. 2A.

The pipe coupling 10 includes a housing 20 and a gasket 100 disposed within the housing 20. As depicted in FIGS. 2A and 2B, the housing can have an annular body 22. Chamfers 24 can be formed into each axial end 26, 28 of the housing body 22, and can extend circumferentially about the housing 20. In some embodiments, the housing body 22 includes an inner wall 30 having a tiered structure adapted to engage pipes 12, 14. For example, a cylindrical groove engaging wall 32, 34 can be formed at each axial end 26, 28 of the housing 20. Each groove engaging wall 32, 34 can have a geometry complimentary to rolled grooves 36, 38 formed in the pipes 12, 14, so that each groove engaging wall 32, 34 can be received within and engage with the grooves 36, 38 to help form a fluidic seal between the pipes 12, 14. Notches 40, 42 formed radially outward (i.e., away from the gasket axis X-X) and axially inward from each groove engaging wall 32, 34 can define circumferential notch walls 44, 46. The circumferential notch walls 44, 46 can engage the nominal outer diameter of the pipes 12, 14, so that when the housing 20 is received around two pipes 12, 14, both the groove engaging walls 32, 34 and the notch walls 44, 46 contact the pipes 12, 14. A channel 48 can be formed axially inward and radially outward from the notch walls 44, 46 to receive and compress the gasket 100, as explained below.

The gasket 100 can be compressed between and around the pipe ends 16, 18 to form a fluidic seal between the pipes 12, 14. As shown in FIG. 2A, the gasket 100 has an annular gasket base 102 extending circumferentially about the gasket axis X-X. In the pipe coupling 10 depicted in FIG. 1, the gasket axis X-X may coincide with the longitudinal axis of the housing 20 and/or the pipes 12, 14.

Figure 3:
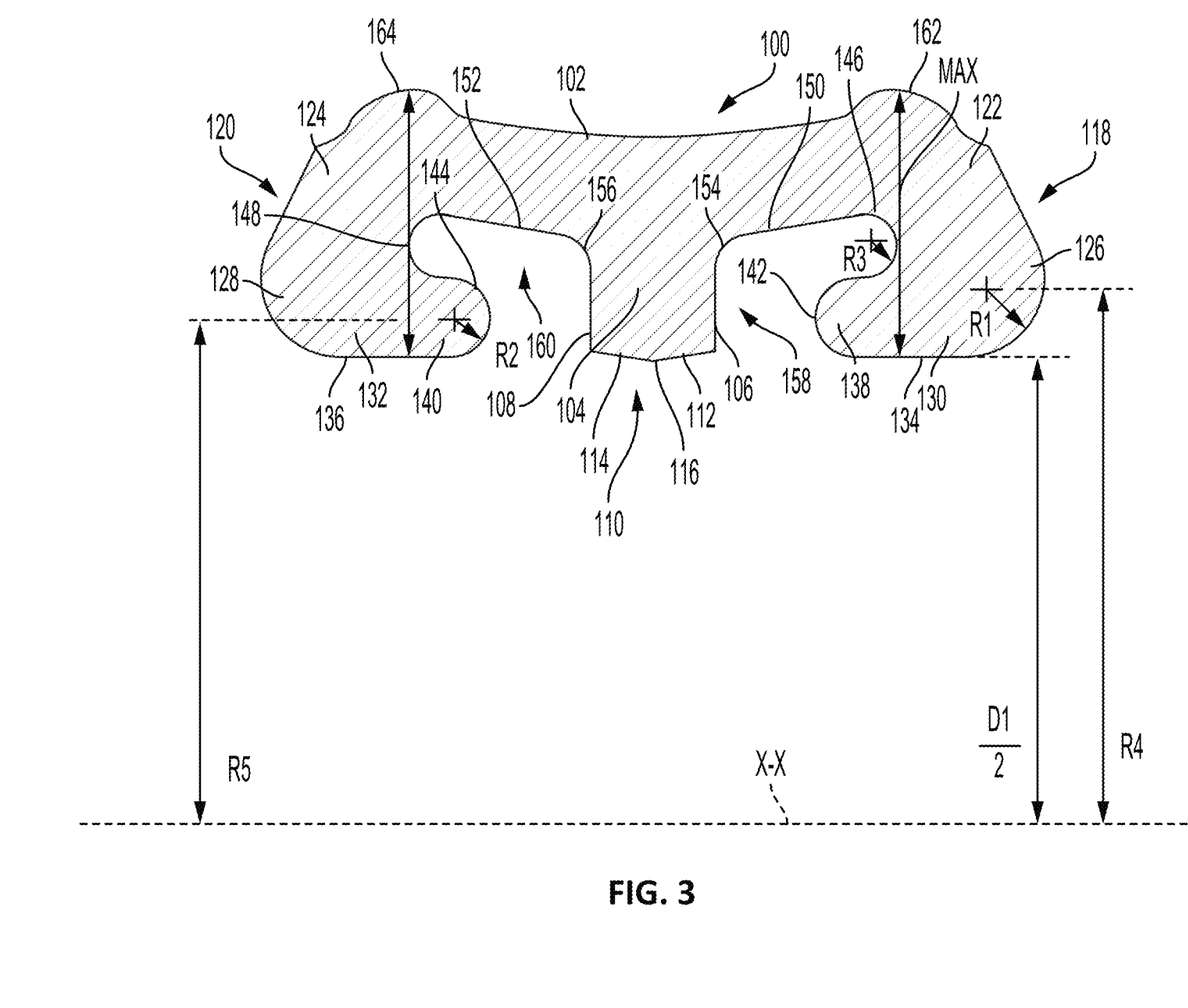
FIG. 3 is a cross-sectional view of the gasket from the pipe coupling of FIG. 1 shown in isolation.

The geometry of the gasket 100 is shown in additional detail in FIG. 3. A central flange 104 extends radially and inwardly away from the gasket base 102 toward the gasket axis X-X. The central flange 104 can have a rectangular cross-section defined by a first flange wall 106, a second flange wall 108 opposite the first flange wall 106, and an apex 110. In some embodiments, the apex 110 includes two angled surfaces 112, 114 which extend radially away from the gasket base 102 and toward one another to form a crest 116. In some embodiments, the circumferential crest 116 is centered, axially, within the gasket 100 and defines the innermost (i.e., closest to the gasket axis X-X) location on the gasket 100. The angled surfaces 112, 114 can help guide and flex the central flange 104 to allow quick and easy movement between the gasket 100 and a pipe 12, 14. Although illustrated and described as including angled surfaces 112, 114, the apex 110 can be a singular surface (e.g., flat or curved) extending between the first flange wall 106 and the second flange wall 108.

Arms 118, 120 extend away from the gasket base 102. The first arm 118 is spaced apart from the central flange 104 and extends radially and inwardly away from the gasket base 102 toward the gasket axis X-X. Similarly, the second arm 120 is spaced apart from the central flange 104 and extends radially and inwardly away from the gasket base toward the gasket axis X-X. The central flange 104 can be positioned between the first arm 118 and the second arm 120. In some embodiments, the arms 118, 120 are symmetrical about the central flange 104.

Each arm 118, 120 can include a reinforcing portion 122, 124 an elbow 126, 128 and a sealing portion 130, 132. The reinforcing portion 122, 124 can angle away from the gasket base 102. For example, the reinforcing portion 122, 124 of each arm 118, 120 can extend axially away from the gasket base 102 and radially inward toward the gasket axis X-X. The reinforcing portion 122, 124 of each arm 118, 120 can extend to a corresponding elbow 126, 128. Each elbow 126, 128 can be defined by an elbow radius R1, for example, which extends axially inward toward the central flange 104 and radially inward toward the gasket axis X-X, to the sealing portion 130, 132. The sealing portions 130, 132 can each define a sealing surface 134, 136 which extends away from the elbow 126, 128 toward the central flange 104. The sealing surfaces 134, 136 can each extend parallel to one another and in opposite directions that are parallel to the gasket axis X-X. Accordingly, both sealing surfaces 134, 136 can be considered coaxial about the gasket axis X-X. In some embodiments, each sealing surface 134, 136 is located further away from the gasket axis X-X than the apex 110 of the central flange 104.

The sealing portion 130, 132 of each arm 118, 120 can include a projection 138, 140 extending axially toward the central flange 104. The projections 138, 140 can have a rounded shape defined by a projection radius R2. In some embodiments, the projection radius R2 is smaller than the elbow radius R1. A projection outer surface 142, 144 defined by the projection radius can extend from the sealing surface 134, 136 radially away from the gasket axis X-X toward a curved inner wall 146, 148 formed in the elbow 126, 128. The curved inner wall 146, 148 can be defined by a curved inner wall radius R3 smaller than the projection radius R2, and therefore, smaller than the elbow radius R1. In some embodiments, the curved inner wall 146, 148 extends from the projection outer surface 142, 144 to a flat inner wall 150, 152. The flat inner wall 150, 152 can extend tangentially away from the curved inner wall 146, 148 to the central flange 104. In some examples, fillets 154, 156 are formed between the flat inner walls 150, 152 and the central flange 104 to create a smoothly curving, continuous surface between the central flange 104 and each flat inner wall 150, 152. Together, the projection outer surfaces 142, 144 the curved inner walls 146, 148, the flat inner walls 150, 152, and the central flange 104 define gasket cavities 158, 160 positioned on either side of the central flange 104. As explained below, the gasket cavities 158, 160 can allow compression and flexing of the arms 118, 120, which in turn promotes seal creation and easy movement about a pipe surface.

The arms 118, 120 and the central flange 104 all extend away from the gasket base 102, which can have a sloping, trough-like shape. Bumps 162, 164 formed on each axial end of the gasket base 102 can extend radially and axially away from a surface of the sloping gasket base 102. In some examples, the bumps 162, 164 define the radially outward-most (i.e., furthest from the gasket axis X-X) portion of the gasket 100. The bumps 162, 164 can be axially aligned with the sealing surfaces 134, 136, such that locations of maximum material thickness (measured perpendicular to the gasket axis) are present between each bump 162, 164 and each arm 118, 120. In some examples, the locations of maximum material thickness occur approximately tangent to the curved inner walls 146, 148 of the gasket 100.

The geometry of the arms 118, 120 can be dependent on the size of the pipes 12, 14 the gasket 100 is intended to help seal. For example, an inner diameter D1 of the gasket 100 (measured as twice the distance from the sealing surface 134, 136 to the gasket axis X-X) can be approximately equal to the nominal outside diameter of the pipe 12, 14 that the gasket 100 is intended to seal. An outside gasket radius R4, measured as the distance from a point concentric with the elbow radius R1 to the gasket axis X-X, can be approximately equal (e.g., within about 10%) to the radius corresponding to the maximum flare dimension on roll grooved pipe. In some embodiments, the elbow radius R1 can be approximately equal (e.g., within about 10%) to the difference between the nominal pipe outer diameter and the maximum flare dimension on roll grooved pipe. Table 1 provides a variety of possible elbow radii R1 which can be used to give the gasket the desired outside gasket radius R4.

TABLE 1

| Size | Pipe Nominal OD (in.) | Max. Flare OD (in.) | Difference (in.) | Elbow Radius R1 (in.) |
|---|---|---|---|---|
| 2 | 2.375 | 2.480 | 0.105 | 0.100 |
| 2.5 | 2.875 | 2.980 | 0.105 | 0.100 |
| 3 | 3.500 | 3.600 | 0.100 | 0.100 |
| 4 | 4.500 | 4.600 | 0.100 | 0.100 |
| 5 | 5.563 | 5.660 | 0.097 | 0.100 |
| 6 | 6.625 | 6.730 | 0.105 | 0.100 |
| 8 | 8.625 | 8.800 | 0.175 | 0.180 |

The gasket 100 can define an inside gasket radius R5. The inside gasket radius R5 is measured from a point concentric with the projection radius R2 to the gasket axis X-X, and can be used to accommodate for the possible pipe 12, 14 dimensional tolerances. In some examples, twice the inside gasket radius R5 (i.e., the inside gasket diameter) is larger than the maximum allowable pipe nominal diameter, factoring in tolerances. Example values of maximum allowable pipe diameters and projection radii R2 are provided in Table 2, below.

TABLE 2

| Size | Pipe Nominal OD (in.) | Possible Tolerance (in.) | Min. Projection Radius R2 (in.) |
|---|---|---|---|
| 2 | 2.375 | 0.024 | 0.024 |
| 2.5 | 2.875 | 0.029 | 0.029 |
| 3 | 3.500 | 0.035 | 0.035 |
| 4 | 4.500 | 0.045 | 0.045 |
| 5 | 5.563 | 0.056 | 0.056 |
| 6 | 6.625 | 0.031 | 0.031 |
| 8 | 8.625 | 0.031 | 0.031 |

As shown above, the size of the elbow radius R1, the projection radius R2, and the curved inner wall radius R3 can all vary depending upon the size of the pipe coupling 10. The relative geometric relationship between each of the radii R1, R2, R3 allow the gasket 100 to be easily positioned upon and between pipes 12, 14. By having the elbow radius R1 larger than the projection radius R2, the gasket 100 can easily slide onto the outermost end 16, 18 of a pipe with minimal flexing or rolling. Simultaneously, the larger elbow radius R1 produces additional gasket thickness near the axial ends of the gasket 100 that, when compressed, extend laterally to create a more robust seal between the gasket 100 and the housing 20. The smaller projection radius R2 allows the gasket 100 to move along a pipe 12, 14 after the gasket 100 has already been received around the pipe 12, 14. The smaller projection radius R2 can help the gasket 100 avoid snagging on grooves 36, 38, for example, when the gasket is being moved along the pipe 12, 14. Because the projections 138, 140 are aligned radially inward from the gasket base 102, the projections 138, 140 can be smaller (e.g., can be defined by a smaller projection radius R2), because when compressed, the projections 138, 140 and the flat inner walls 150, 152 engage one another to create additional sealing. The curved inner wall radius R3 is smaller than the projection radius R2, which allows the flat inner walls 150, 152 to contact the projections 138, 140 by elastic deformation when the gasket 100 is compressed by the housing 20.

Figure 4A:
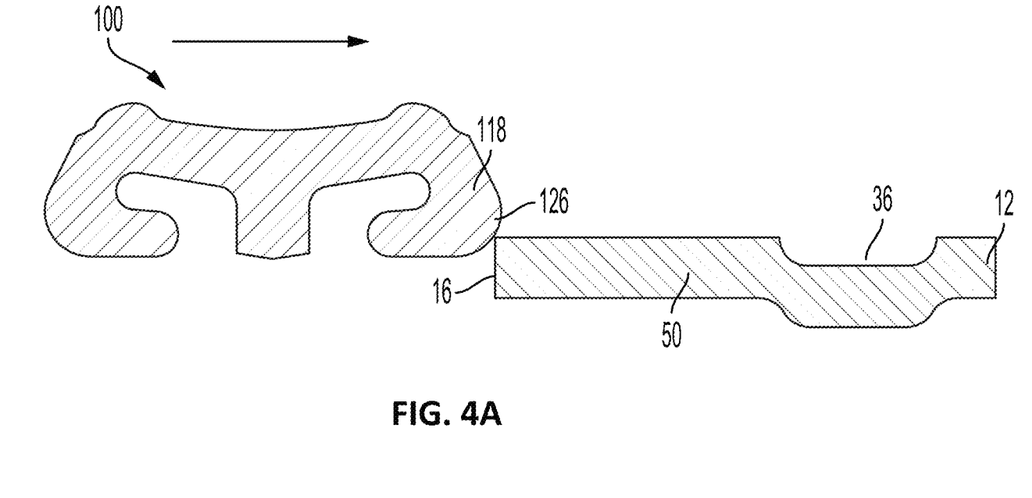
FIG. 4A demonstrates the installation process for positioning the gasket of FIG. 3 onto a pipe.
Figure 4B:
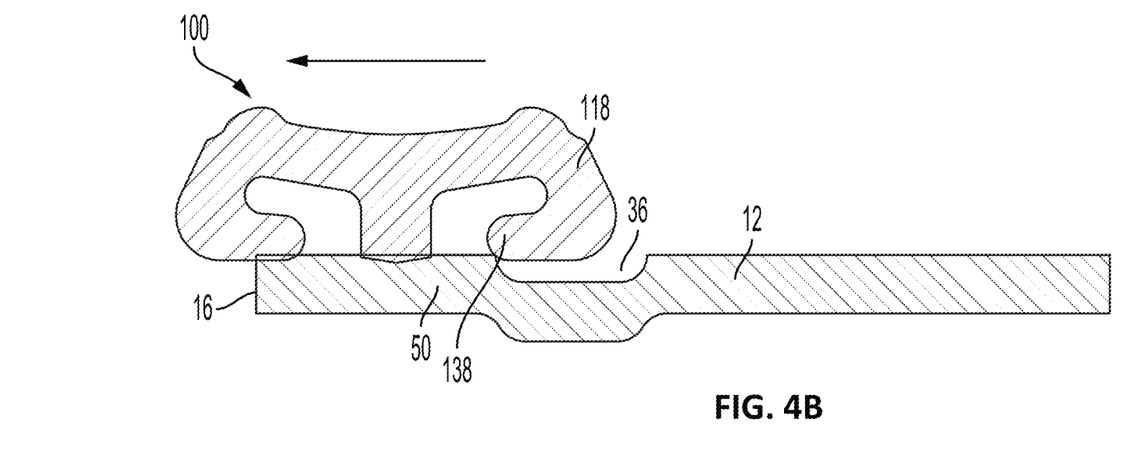
FIG. 4B demonstrates the removal or adjustment process for positioning the gasket of FIG. 3 once it has been installed.

The above dimensions can enable methods of improved gasket installation and removal, as illustrated by FIGS. 4A and 4B. The gasket 100 can initially be fitted over the outer diameter of a pipe 12, 14, for example. As illustrated, the end 16 of the pipe 12 may have a flared section 50, which the gasket 100 may engage when being installed onto the pipe 12. As illustrated in FIG. 4A, the gasket 100 can be urged toward the pipe 12 (or vice versa) to install the gasket 100 onto the pipe 12. Because the outside gasket radius R4 is greater than the radius of the maximum flare condition in the flared section 50, the pipe end 16 contacts the gasket 100 in the elbow 126, rather than the reinforcing portion 122 of the arm 118. The engagement between the elbow 126 and the pipe end 16 occurs in the half of the elbow 126 that is nearer to the gasket axis X-X (see FIG. 3), which causes the arm 118 of the gasket 100 to flex inward slightly while simultaneously centering the pipe end 16 within the gasket 100 along the gasket axis X-X. The resilient nature of the gasket 100 allows the arm 118 of the gasket 100 to displace slightly while the pipe end 16 is passed through the gasket 100. Optionally, the gasket 100 can be urged onto the pipe 12 beyond the rolled groove 36 and/or onto the nominal diameter of the pipe 12, so that the arm 118 can relax and return to its resting orientation. In some examples, the pipe 12 and gasket 100 assembly can be shipped or otherwise transported together to a jobsite to improve efficiency associated with installing or maintaining a piping system.

The gasket 100 geometry can enable the gasket 100 to be readily removed or otherwise moved upon the pipe 12 in the direction opposite to the gasket installation direction. Specifically, the inside gasket radius R5 can be sized to enable the gasket to move easily over the rolled groove 36 back onto the flared section 50 of the pipe end 16. When the gasket 100 moves outwardly toward the pipe end 16, the arm 118 of the gasket 100 may pass axially through the rolled groove 36, which may allow the arm 118 to temporarily return to its resting orientation before once again contacting the flared section 50 of the pipe end 16. Adjacent the rolled groove 36, the flared section 50 of the pipe end 16 should have a diameter corresponding to, at most, the maximum allowable nominal pipe outer diameter. Because the inner gasket radius R5 is larger than the maximum nominal pipe outer radius, the projection 138 of the gasket 100 will contact the opposite side of the groove 36 in the half of the projection 138 nearest the gasket axis X-X. Accordingly, the projection 138 may flex slightly outward as it passes onto the flared section 50 of the pipe end 16, but will not catch or otherwise snag on the flared section 50 as it exits the rolled groove 36. The projection 138 does not directly oppose the flared section 50 at the point of contact between the two, such that the projection 138 can easily slide over and beyond the rolled groove 36 onto the flared section 50 with minimal displacement. Accordingly, the gasket 100 geometry produces a gasket 100 that can be conveniently and movably placed upon the pipe 12. The gasket 100 can be easily and quickly installed onto a pipe 12, 14 and can be readily positioned upon the pipe 12, 14 to eventually create a pipe coupling 10, for example.

Returning now to FIGS. 1, 2B, 4A, and 4B, a process for creating a pipe coupling 10 is illustrated. Initially, the gasket 100 can be received onto the pipe 12, as shown in FIG. 4A. The gasket 100 can be urged onto the outer diameter of the pipe 12, from the flared section 50, to the rolled groove 36, and/or beyond the rolled groove onto the nominal outer diameter of the pipe 12. Next, a second pipe 14 can be positioned coaxially with the first pipe 12 and the gasket axis X-X. As shown in FIG. 4B, the gasket 100 can then be moved outwardly, back toward the flared section 50 of the pipe 12. The gasket 100 can be moved outward until one arm 120 contacts and engages the second pipe 14 and the central flange 104 is centered within the gap formed between the two axial ends 16, 18 of the pipes 12, 14, as shown in FIG. 2B. With each of the sealing surfaces 134, 136 of the gasket 100 contacting different pipes 12, 14, the housing 20 can be positioned around the gasket 100. The channel 48 of the housing 20 can surround the gasket base 102 and compress the gasket 100 inward to form a fluidic seal between the pipes 12, 14 when the housing 20 is fastened to the pipes 12, 14. When compressed, the bumps 162, 164 on the gasket base 102 deform laterally in both directions, as illustrated in FIG. 2B. The bump locations on the gasket base 102, axially inward from the outer surface of the reinforcing portion 122, 124 of each arm 118, 120, minimize the potential for gasket pinching as the gasket 100 is compressed by the housing 20.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

While the present disclosure has been disclosed with reference to certain embodiments, numerous modifications, alterations, and changes to the described embodiments are possible without departing from the sphere and scope of the present disclosure, as defined in the appended claims. Accordingly, it is intended that the present disclosure not be limited to the described embodiments, but that it has the full scope defined by the language of the following claims, and equivalents thereof

What is claimed is:

1. A pipe coupling, comprising:
   a housing defining a channel; and
   a gasket received within the channel comprising:
   an annular gasket base extending circumferentially about a gasket axis, the gasket base comprising an outer surface forming a radially outward-most portion of the gasket relative to the gasket axis;
   a central flange extending radially and inwardly away from the gasket base toward the gasket axis, the central flange having an apex positioned at a first distance from the gasket axis,
   a first arm spaced apart from the central flange and extending radially and inwardly away from the gasket base toward the gasket axis, the first arm including a first sealing portion defining a first sealing surface spaced apart from the gasket axis by a second distance greater than the first distance and extending toward the central flange, parallel to the gasket axis, in a first direction, the first arm including a projection extending from the first sealing portion toward the central flange, the first arm including a curved inner wall extending from the projection and between the first sealing surface and the gasket base, the curved inner wall forming a cavity between the curved inner wall and the central flange, the gasket having a location of maximum thickness that is defined on a line from the outer surface to the first sealing surface in a direction perpendicular to the gasket axis and that is tangent to the curved inner wall; and
   a second arm spaced apart from the central flange and extending radially and inwardly away from the gasket base toward the gasket axis, the second arm including a second sealing portion defining a second sealing surface spaced apart from the gasket axis by the second distance and extending toward the central flange, parallel to the gasket axis, in a second direction opposite the first direction.

2. The pipe coupling of claim 1, comprising:
the housing and the gasket are positioned coaxial about the gasket axis.

3. The pipe coupling of claim 1, comprising:
the housing has an annular body.

4. The pipe coupling of claim 1, comprising:
the housing includes a tiered inner wall.

5. The pipe coupling of claim 1, comprising:
an inner wall of the housing includes a first cylindrical groove engaging wall formed at a first axial end of the housing and a second cylindrical groove engaging wall formed at a second axial end of the housing opposite the first axial end.

6. The pipe coupling of claim 1, comprising:
an inner wall of the housing includes a first cylindrical groove engaging wall formed at a first axial end of the housing and a second cylindrical groove engaging wall formed at a second axial end of the housing opposite the first axial end and the first cylindrical groove engaging wall extends from the first axial end of the housing inward, toward the second axial end of the housing, and approximately parallel to the gasket axis.

7. The pipe coupling of claim 1, comprising:
the housing is formed of at least two metallic components, the at least two metallic components being removably coupled to one another.

8. The pipe coupling of claim 1, comprising:
the channel is formed between and axially spaced apart from a first housing axial end and a second housing axial end.

9. The pipe coupling of claim 1, comprising:
the channel is partially defined by a cylindrical surface positioned radially outward from an inner wall of the housing, the cylindrical surface being coaxial with the gasket about the gasket axis.

10. The pipe coupling of claim 1, comprising:
the housing is partially defined by a tiered inner wall, the tiered inner wall having a first cylindrical groove engaging wall formed at a first housing axial end, a second cylindrical groove engaging wall formed at a second housing axial end, a first notch formed radially outward and axially inward from the first cylindrical groove engaging wall to define a first circumferential notch wall centered about the gasket axis, a second notch formed radially outward and axially inward from the second cylindrical groove engaging wall to define a second circumferential notch wall centered about the gasket axis, and the channel formed radially outward from each of the first circumferential notch wall and the second circumferential notch wall and axially between each of the first circumferential notch wall and the second circumferential notch wall.

11. A gasket, comprising:
an annular gasket base extending circumferentially about a gasket axis, the gasket base comprising a radially outward-most portion of the gasket relative to the gasket axis;
a central flange extending radially and inwardly away from the gasket base toward the gasket axis, the central flange having an apex positioned at a first distance from the gasket axis;
a first arm spaced apart from the central flange and extending radially and inwardly away from the gasket base toward the gasket axis, the first arm including a first sealing portion defining a first sealing surface spaced apart from the gasket axis by a second distance greater than the first distance and extending toward the central flange, parallel to the gasket axis, in a first direction, the first arm including a curved inner wall between the first sealing surface and the gasket base, the curved inner wall forming a cavity between the curved inner wall and the central flange, a maximum thickness of the gasket is on a line that is from the radially outward-most portion of the gasket to the second sealing surface and that is tangent to the curved inner wall; and
a second arm spaced apart from the central flange and extending radially and inwardly away from the gasket base toward the gasket axis, the second arm including a second sealing portion defining a second sealing surface spaced apart from the gasket axis by the second distance and extending toward the central flange, parallel to the gasket axis and to the first sealing surface, in a second direction opposite the first direction.

12. The gasket of claim 11, comprising:
the first arm is defined by a first reinforcing portion extending axially away from the gasket base and radially inward toward the gasket axis to a first elbow defined by a first elbow radius, the first elbow bending axially inward toward the central flange and radially inward toward the gasket axis to the first sealing portion.

13. The gasket of claim 11, comprising:
the first arm includes an elbow bending axially inward toward the central flange and radially inward toward the gasket axis to the first sealing portion, the first sealing portion including a first projection extending toward the central flange, the first projection being defined by a first projection radius smaller than a first elbow radius defining a first elbow outer surface.

14. The gasket of claim 11, comprising:
the first arm includes a first projection, the first projection having a first projection outer surface defined by a first projection radius curving from the first sealing surface radially away from the gasket axis toward the curved inner wall, the curved inner wall defined by a first curved inner wall radius smaller than the first projection radius.

15. The gasket of claim 11, comprising:
a first gasket cavity is formed radially inward from the apex of the central flange and radially inward from the first sealing surface, the first gasket cavity being defined by a first projection, the curved inner wall, a first flat inner wall, and the central flange, the first projection extending away from the first sealing surface to the curved inner wall, the curved inner wall curving to the first flat inner wall, and the first flat inner wall extending axially to the central flange.

16. A gasket, comprising:
an annular gasket base extending circumferentially about a gasket axis;
a central flange extending radially and inwardly away from the gasket base toward the gasket axis, the central flange having an apex positioned at a first distance from the gasket axis, the apex of the central flange includes two angled surfaces extending axially and radially inward toward one another to form a crest, the crest being positioned at the first distance from the gasket axis;
a first arm spaced apart from the central flange and extending radially and inwardly away from the gasket base toward the gasket axis, the first arm including a first sealing portion defining a first sealing surface spaced apart from the gasket axis by a second distance greater than the first distance and extending toward the central flange, parallel to the gasket axis prior to being tightened around two pipes, in a first direction; and
a second arm spaced apart from the central flange and extending radially and inwardly away from the gasket base toward the gasket axis, the second arm including a second sealing portion defining a second sealing surface spaced apart from the gasket axis by the second distance and extending toward the central flange, parallel to the gasket axis, in a second direction opposite the first direction.

* * * * *